Dec. 29, 1959          C. A. NORTON          2,918,893
LEAKAGE INDICATOR FOR LIQUID FUEL SYSTEMS
Filed Nov. 17, 1955
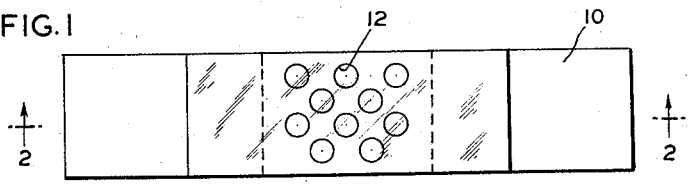
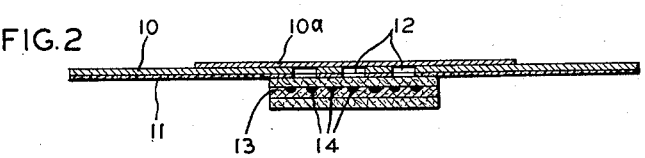
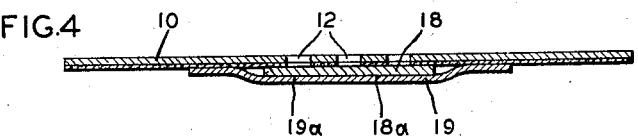
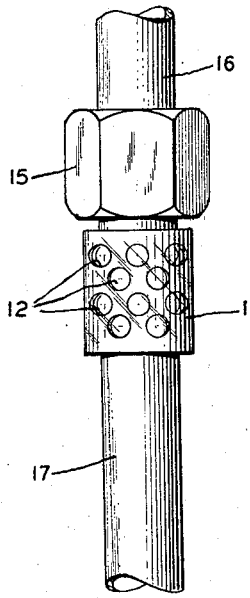
INVENTOR
CLYDE A. NORTON
BY
ATTORNEYS

United States Patent Office 2,918,893
Patented Dec. 29, 1959

2,918,893

LEAKAGE INDICATOR FOR LIQUID FUEL SYSTEMS

Clyde A. Norton, Greenwich, Conn.

Application November 17, 1955, Serial No. 547,425

7 Claims. (Cl. 116—114)

This invention relates to a leakage indicator for liquid fuel systems employing liquid hydrocarbon fuels such as gasoline, kerosene, fuel oil and the like, and is particularly adapted and intended to be used on gasoline, kerosene, and fuel oil feed systems on boats, oil burners, airplanes and the like.

It is an object of this invention to provide a leakage indicator which is relatively cheap to manufacture and install, and which will give an unfailing indication of fuel leakage whenever it occurs, so that visual inspection will show that a leak has occurred, and which, conversely, will not give such an indication in the absence of a leak.

It is a further object of this invention to provide such an indicator which can be quickly and easily attached to existing fuel lines without the use of tools, and which will not be affected by dampness, salt water or the like.

It is a further object of this invention to provide such an indicator in the form of an adhesive strip, which can be manufactured and sold in quantities at a price of the order of a few cents.

Still other objects and advantages of my invention will be apparent from the specification.

The features of novelty which I believe to be characteristic of my invention are set forth with particularity in the appended claims. My invention itself, however, both as to its fundamental principles and to its particular embodiments, will best be understood by reference to the specification and accompanying drawing, in which:

Fig. 1 is a top plan view of one form of indicator in accordance with my invention;

Fig. 2 is a section on lines 2—2 of Fig. 1;

Fig. 3 is a fragmentary view showing the indicator as applied around an oil or gasoline feed line, and Fig. 4 is a figure, similar to Fig. 2, of a modified form of indicator in accordance with my invention.

Referring now more particularly to the embodiment of the invention shown in Figs. 1 and 2, the indicator may consist of a flexible backing strip 10 of woven fabric such as ordinary white adhesive tape; or of cellophane, rubber hydrochloride, or other transparent material such as that sold under the trade names "Pliofilm," "Mylar," "Scotch Tape," etc., preferably having a layer of pressure-sensitive adhesive applied to one face as at 11. If the strip is not of transparent material, a series of perforations 12 is preferably provided in the central part of the strip for a purpose that will be hereinafter explained, but if the strip and adhesive are transparent, such perforations may be omitted.

It may be noted that some types of pressure-sensitive adhesives are soluble in hydrocarbons, such as gasoline, and to assure permanent adhesion of the strip to a fuel line carrying liquid hydrocarbon fuel, a pressure-sensitive adhesive insoluble in liquid hydrocarbon fuel should be used. Such liquid hydrocarbon-insoluble adhesives are known in the art, and as examples, may be mentioned adhesives employing Buna N synthetic rubber (butadiene acrilonitrile synthetic), "Neoprene," etc. rather than natural rubber.

Attached to the adhesive layer, I may provide a fold of cotton or similar fabric enclosing within the fold a pad of absorbent cotton or similar material 13. The construction, thus far described, in which the backing strip is of woven fabric, is similar to the construction of ready made adhesive first aid bandages marketed by Johnson and Johnson and commonly sold in drug stores under the name "Band Aid."

For the purpose of giving an indication of liquid hydrocarbon fuel leaks, the pad consisting of fabric 12 and absorbent cotton fiber 13 is sprinkled interiorly with grains 14 of a gasoline-soluble but water-insoluble dye, preferably in dry powder form. Many such dyes are available in various colors, and a wide choice of dyes may be made depending on the particular purpose for which the indication is wanted. Particularly good results have been obtained with a dye known as "Sudan Black" obtainable from General Dyestuffs Corporation, New York, N.Y. Other suitable dyes of other colors, such as red, orange, magenta, etc. are obtainable from Nova Chemical Corporation, New York, N.Y.

Tests have shown that when incorporated in a pad, such as described, the dye dissolves practically instantaneously when a drop or two of gasoline, kerosene, or fuel oil touches the pad, and permeates the pad and fabric almost instantaneously, giving a distinctive color to the pad and fabric, and providing an unmistakable indication of a leak which cannot be missed even at the most cursory glance, colored spots being visible through the perforations 12 or through the transparent strip. To prevent contamination and discoloration by dirt or dust of the fabric visible through the perforations, they may be covered by a topping layer of transparent tape 10a, such as "Scotch Tape," but this may be omitted if desired.

Before the leak occurs, the fabric observable is of its normal color, preferably white, and tests have shown that no discoloration occurs, even when the strip is wet with sweet or salt water. Long exposure of indicator strips, in accordance with this invention, to water has failed to produce any discoloration or indication of dye coloring from water alone, but even strips which are wet with water will immediately show discoloration when touched by a drop or two of gasoline, kerosene or fuel oil.

In place of the fabric and cotton pad, other absorbent material may be used, for example, a layer or layers of absorbent paper, such as blotting paper.

In applying the indicators they may be and preferably will be applied immediately below joints in the fuel line as indicated in Fig. 3, wherein 15 represents a union or nut into which the fuel lines 16 and 17 are inserted to form a joint. Leakage in fuel lines most frequently occurs at such joints, due to the joint loosening from vibration, strain or other causes. Preferably the indicator strip is wrapped around the pipe and secured by pressure in position just below and adjacent the joint, on some vertical portion of the pipe, whereby any gasoline or oil leaking at the joint will run down and be absorbed in the pad and thereby dissolve the dye and permeate the pad, making the discoloration apparent. Naturally the strip should be arranged in such a manner that the pad is easily visible at a glance, wherever this is possible. Tests have shown, however, that the indicator works equally well on horizontal portions of the pipe, provided it is placed sufficiently near the joint so that the fuel reaches the indicator before dripping off or evaporating.

The fabric pad may be omitted if desired, and the dye sprinkled on the face of the adhesive, but for various reasons this is not as satisfactory as employing the pad.

Referring now more particularly to the modification shown in Fig. 4, in this instance, instead of dye, I have employed paper coated with what are known as ion exchange color formers which are adapted by an ion exchange process to form a colored substance when the color formers come in contact, as will be explained.

In the present instance, a layer of paper 18 having one side 18a coated with a layer of color former is placed on the adhesive side of the strip with the coated side of the paper on the outside as shown. Another outer and overlapping strip of paper 19, having its inner face 19a coated with the other color former is placed on the outer face of strip 18, with the ends overlapping strip 18 and pressed against the adhesive layer 11 as shown. Such paper is obtainable from National Cash Register Company under the name of "No Carbon Required" paper and is ordinarily used for the purpose of making the equivalent of carbon copies but without the use of carbon paper. When one treated sheet of paper is placed upon another treated sheet of paper with the coated faces against each other, writing upon the top sheet causes a reproduction of the writing to appear on the second sheet through a process which consists of pressure rupture of the coating of the color former material on one sheet, allowing it to come into contact with the color former on the second sheet to produce the desired color by ion exchange where the pressure has occurred. The various ion exchange processes by which the color may be produced are well known and described in various U.S. patents as follows:

2,299,693
2,299,694
2,374,862
Re. 23,024
2,443,092
2,458,328
2,474,084
2,505,470 thru 2,505,489, inclusive (20 patents)
2,548,364
2,548,365
2,548,366
2,550,466 thru 2,550,473, inclusive (8 patents)
2,618,573
2,618,866
2,641,557
2,646,367
2,654,673
2,655,453
2,663,579
2,669,503
2,672,396

It appears that such color formers are held away from each other, to inhibit the color forming action, by a thin pressure-rupturable coating and tests have shown that the application of gasoline, kerosene, fuel oil, etc., which is absorbed by the paper, permits the color formers to come in contact with one another, upon which the ion exchange producing the colors occurs, and the strip develops the characteristic color practically instantaneously as in the embodiment shown in Figs. 1 and 2. Tests have also indicated that application of water, either fresh or salt, does not produce dissolving of the coating and does not produce the development of color. As in the case of the embodiment of Figs. 1 and 2, strips wet with water, which have not shown color, immediately produce a color indication when subjected to gasoline, even when wet with water.

It is desirable, for clear indication of discoloration, that the paper used in this embodiment of the invention be transparent, or partially so. Also, if desired, the color former coatings may be applied to material other than paper, such as cloth, or one color former may be coated on cloth and the other on paper.

It is also to be noted that "NCR" paper is very sensitive to acid, even to the minute concentrations of acid vapor in the atmosphere, as shown by the fact that a layer of such paper left exposed to the air for a few days changes color even though the presence of minute amounts of acid vapor cannot be detected otherwise. Therefore, in using this embodiment of the invention, it may be well to guard against false indications of leaks, caused by acid vapor in the air, by placing one or more indicator strips in the area of the fuel lines, but where they cannot be touched by the fuel.

A color change of the fuel line indicators with no change in the area indication, is positive indication of a leak, but similar discolorations of both do not necessarily indicate a fuel leak, but more likely the presence of acid vapor. However, it has been found that covering the color former coated paper delays or prevents the color change due to acid vapor, and tests have shown that strips according to this embodiment, protected by an outer layer of tape or fabric, such as shown and described with reference to Fig. 4, do not discolor except from contact with leaking fuel.

While I have shown the coloring agents, either dye or color formers, as applied in the form of pads of the full width of the strip but of only part of the length, it will be clear that if desired, the pad may be made the full length of the strip but of less than full width, the object being, of course, to leave the adhesive coated portions available to be pressed against the fuel line on which the indicator is to function.

In case the backing strip 10 is not transparent, in place of the perforations, which may be omitted, the fabric 12 and cotton 13 may project slightly beyond the edges of the backing strip 10, to afford a visible area showing discoloration in case of a leak. If the backing strip and the adhesive are transparent, as in the case of "Scotch Tape," the perforations or projecting edges are not necessary and may be omitted, since the discoloration caused by the leak can be plainly seen through the unperforated tape.

As used herein the term "strip" is used to mean patches of various shapes and sizes, such as round, square, odd-shaped, as well as the usual meaning. The "strip" may be made as long as desired, may be wrapped spirally over the entire length of the line, or may be attached longitudinally of the line. In the case of long strips, the indicator pads may be spaced at intervals on the strip, or may extend continuously along it.

The color agent, if a dye, may be protected against air and water by being first coated with a thin layer of hydrocarbon fuel-soluble wax such as paraffin. This may be done by melting the paraffin, mixing the dye with the melted paraffin, cooling the mix and finely dividing the mix. In the case of color formers operating by ion exchange one or more of the color former coated paper or fabric carriers may be given a light coating of paraffin or other suitable wax soluble in the hydrocarbon fuel, the leakage of which is to be indicated.

While I have shown and indicated certain preferred embodiments of my invention, it will be understood that modifications and changes may be made without departing from the spirit and scope of my invention.

I claim:

1. A new article of manufacture for giving a visible signal of liquid hydrocarbon fuel leakage, consisting of a strip of material, a water-insoluble, hydrocarbon liquid fuel-soluble dye mounted on a portion of said strip, and means applied to the remaining portion of said strip for attaching said strip to a support.

2. A new article of manufacture for giving a visible signal of liquid hydrocarbon fuel leakage, consisting of a strip of material, a piece of fabric attached to a portion of said strip of material, carrying a dry hydrocarbon liquid fuel-soluble and water-insoluble dye and means on another portion of said strip for attaching said strip and piece of fabric to a support.

3. A new article of manufacture for giving a visible signal of liquid hydrocarbon fuel leakage, consisting of a strip of material, a hydrocarbon liquid fuel-soluble, water-insoluble dye impregnating a portion of said strip, and an adhesive coating on another portion of said strip.

4. A new article of manufacture for giving a visible signal of liquid hydrocarbon fuel leakage, consisting of a strip of material carrying absorbent material showing no visible indicating color, said absorbent material being provided with a water-insoluble liquid hydrocarbon fuel-soluble color indicator giving a visible color indication when wet with said fuel, and adhesive means on another portion of said strip for attaching said strip to a support.

5. A new article of manufacture for giving a visible signal of liquid hydrocarbon fuel leakage, consisting of a strip of material, a hydrocarbon liquid-soluble, water-insoluble dye deposited in a portion of said strip, and an adhesive coating on another portion of said strip for attaching the same to a fuel holder, said dye being so deposited as to be invisible when said strip is attached to said fuel holder and when said dye is in its deposited form, but giving a visible color signal when wet by said fuel.

6. A new article of manufacture as claimed in claim 5, in which said dye is deposited in dry form.

7. A new article of manufacture as claimed in claim 5 in which said dye is deposited in dry powder form.

References Cited in the file of this patent
UNITED STATES PATENTS

| | | |
|---|---|---|
| 1,800,693 | Major | Apr. 14, 1931 |
| 1,997,670 | Armour | Apr. 16, 1935 |
| 2,046,365 | Cassidy | July 7, 1936 |
| 2,133,609 | Eustis | Oct. 18, 1938 |
| 2,490,933 | Tornquist | Dec. 13, 1949 |
| 2,601,840 | Smith | July 1, 1952 |
| 2,708,896 | Smith | May 24, 1955 |